United States Patent [19]
Gutteridge et al.

[11] Patent Number: 5,583,291
[45] Date of Patent: Dec. 10, 1996

[54] MICROMECHANICAL ANCHOR STRUCTURE

[75] Inventors: Ronald J. Gutteridge, Paradise Valley; Daniel N. Koury, Jr., Mesa, both of Ariz.

[73] Assignee: Motorola, Inc., Schaumburg, Ill.

[21] Appl. No.: 509,368

[22] Filed: Jul. 31, 1995

[51] Int. Cl.[6] .................. G01P 15/00; G01P 15/125; G01L 9/12; H01G 7/00
[52] U.S. Cl. .................. 73/514.38; 73/514.32; 73/718; 73/724; 361/283.3
[58] Field of Search .................. 73/514.32, 514.38, 73/718, 724; 361/283.3

[56] References Cited

U.S. PATENT DOCUMENTS

| | | | |
|---|---|---|---|
| 5,241,864 | 9/1993 | Addie et al. | 73/718 |
| 5,249,465 | 10/1993 | Bennett et al. | 73/514.32 |
| 5,337,606 | 8/1994 | Bennett et al. | 73/514.36 |
| 5,487,305 | 1/1996 | Ristic et al. | 73/514.32 |

OTHER PUBLICATIONS

R. Mullen et al., "Theoretical Modeling of Boundary Conditions in Microfabricated Beams", IEEE, New York, 1991, pp. 154–159.

Q. Meng et al., "Theoretical Modeling of Microfabricated Beams with Elastically Restrained Supports", Journal of Microelectromechanical Systems, vol. 2, No. 3, IEEE, Sep. 1993, pp. 128–137.

P. Hesketh et al., "Micromachining", The Electrochemical Society Interface, vol. 3, No. 4, 1994, pp. 21–26.

L. Ristic et al., "A Two–Chip Accelerometer System For Automotive Applications", Microsystems Technologies 1994 Conference, 4th International Conference Micro Electro Opto, Mechanical Systems & Components, Berlin, Oct. 1994, pp. 77–84.

*Primary Examiner*—Hezron E. Williams
*Assistant Examiner*—Richard A. Moller
*Attorney, Agent, or Firm*—Miriam Jackson; Robert F. Hightower

[57] ABSTRACT

A micromachined structure having at least one anchor that includes a supporting substrate with a first and a second foot fixedly positioned on the surface of the substrate and each foot has a supporting edge, which edges are positioned in parallel spaced apart relationship, an elongated tether positioned in spaced relation from the surface of the substrate and extending from the micromachined structure parallel to the parallel supporting edges of the first and the second foot, and first and second risers extending along the supporting edges of the first foot and the second foot, respectively, and rising upwardly to the edges of the tether. The first and the second foot, the first and second risers and the tether being formed integrally by surface micromachining.

19 Claims, 3 Drawing Sheets

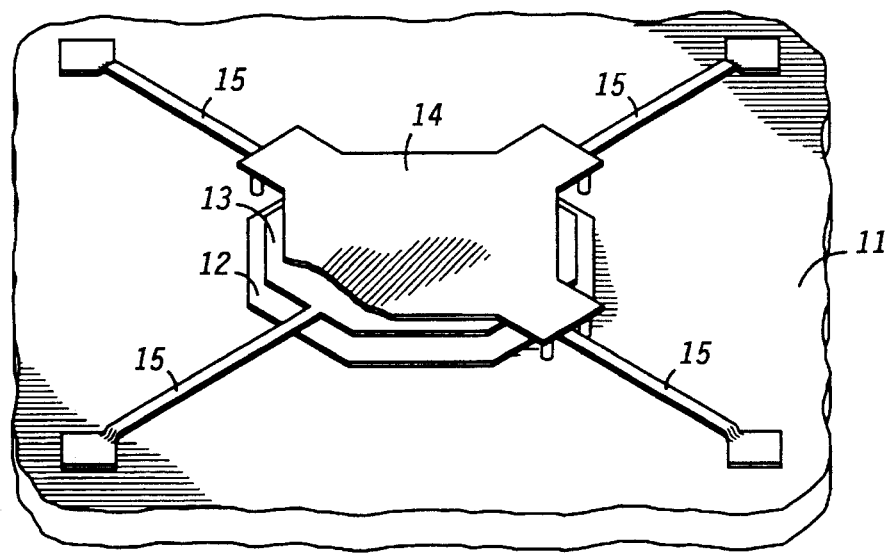
FIG. 1
—PRIOR ART—
FIG. 2
—PRIOR ART—
FIG. 3
—PRIOR ART—
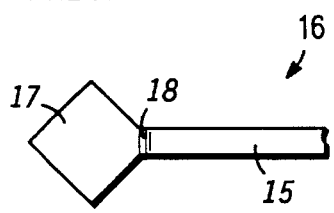
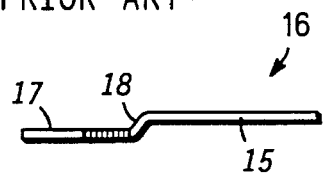
FIG. 4
—PRIOR ART—

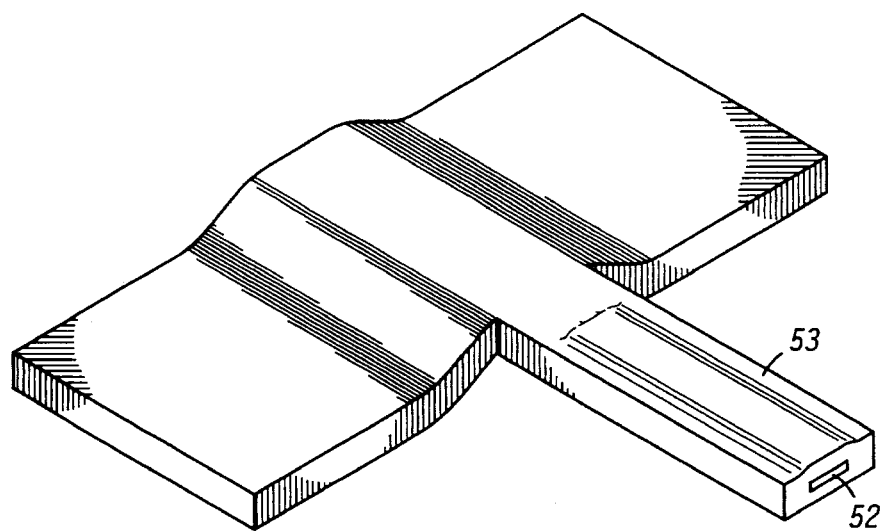
*FIG. 8*
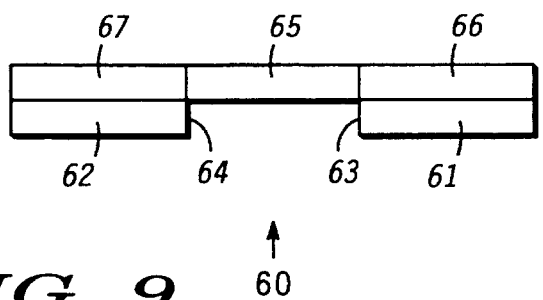
*FIG. 9*
*FIG. 10*
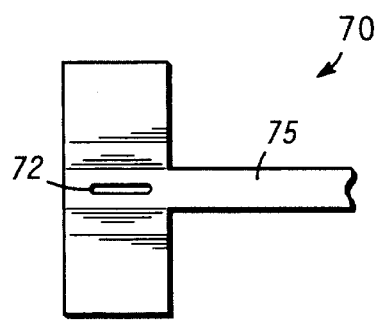

MICROMECHANICAL ANCHOR STRUCTURE

BACKGROUND OF THE INVENTION

The present invention pertains to microelectromechanical systems. More particularly, the present invention pertains to double pinned micromechanical sensors.

In many industries there is a need for large quantities of low cost and reliable sensing devices. As a specific example, the automotive industry requires a high volume of accelerometers used in ride control, inertial navigation, and crash sensing for airbag deployment. In each of these applications as well as many others, reliability, and low costs are key requirements. While large scale mechanical devices have long been known, they are not capable of meeting all these requirements. Thus, micromechanical sensors, such as pressure sensors and accelerometers are being actively pursued.

In attempts to provide micromechanical sensors which will meet the desired requirements, designers have employed approaches based on piezoresistive, capacitive, and piezoelectric sensing, as well as resonators. Each of these approaches has limitations. For example, piezoelectric accelerometers generally have limited low frequency response. Accelerometers based on resonators depend on high quality factor, Q, to achieve the required performance. Piezoresistive accelerometers suffer from temperature sensitivity due to the temperature coefficient of resistivity in silicon. Capacitive sensors are subject to electromagnetic interference.

Many types of micromachined sensors, such as gyroscopes or accelerometers, share one common feature, they use a seismic mass. The underlying principle of operation is that this mass experiences a displacement when subjected to the force being measured. In capacitive sensors, the mass is suspended over a substrate. The variation in the spacing between the mass and the substrate typically produces a proportional variation in capacitance value from which the force can be determined. Different fabrication technologies are employed in an attempt to achieve a sensor with the desired characteristics. These techniques range from bulk and surface micromachining to pseudo-bulk micromachining and wafer bonding.

It is an object of the present invention to provide improvements in surface micromachined sensor devices.

Another object of the invention is to reduce temperature sensitivity of surface micromachined sensor.

And another object of the invention is to provide improved step-up supports for surface micromachined sensor devices.

SUMMARY OF THE INVENTION

Briefly, to achieve the desired objects of the present invention, first provided is a micromachined structure including at least one anchor formed on a supporting substrate, a first foot fixedly positioned on the surface of the substrate and having a supporting edge, an elongated tether positioned in spaced relation from the surface of the substrate and extending from the micromachined structure to the supporting edge of the first foot, and a first riser extending along the edge of the first foot and rising from the supporting edge of the first foot upwardly to the tether, the first riser being fixedly attached to the supporting edge of the first foot and the tether. In some embodiments, the riser is incorporated into the foot.

BRIEF DESCRIPTION OF THE DRAWINGS

The foregoing and further and more specific objects and advantages of the present invention will become readily apparent to those skilled in the art from the following detailed description of a preferred embodiment thereof taken in conjunction with the drawings, in which:

FIG. 1 is a view in perspective of a prior art micromachined sensor;

FIG. 2 is an enlarged view in top plan of a portion of the micromechanical sensor of FIG. 1;

FIG. 3 is a view in side elevation of the portion of the micromechanical sensor illustrated in FIG. 2;

FIG. 4 is an enlarged view in perspective of the portion of the micromechanical sensor illustrated in FIG. 2 with the broken away portions shown in section;

FIG. 8 is an enlarged view in perspective of the portion of the micromechanical sensor illustrated in FIG. 6 with broken away portions shown in section;

FIG. 9 is a sectional view, similar to FIG. 7 of a portion of a slightly modified micromechanical sensor; and FIG. 10 is a top plan view of another embodiment of an anchor in accordance with the present invention.

DETAILED DESCRIPTION OF THE DRAWINGS

Figure 5:
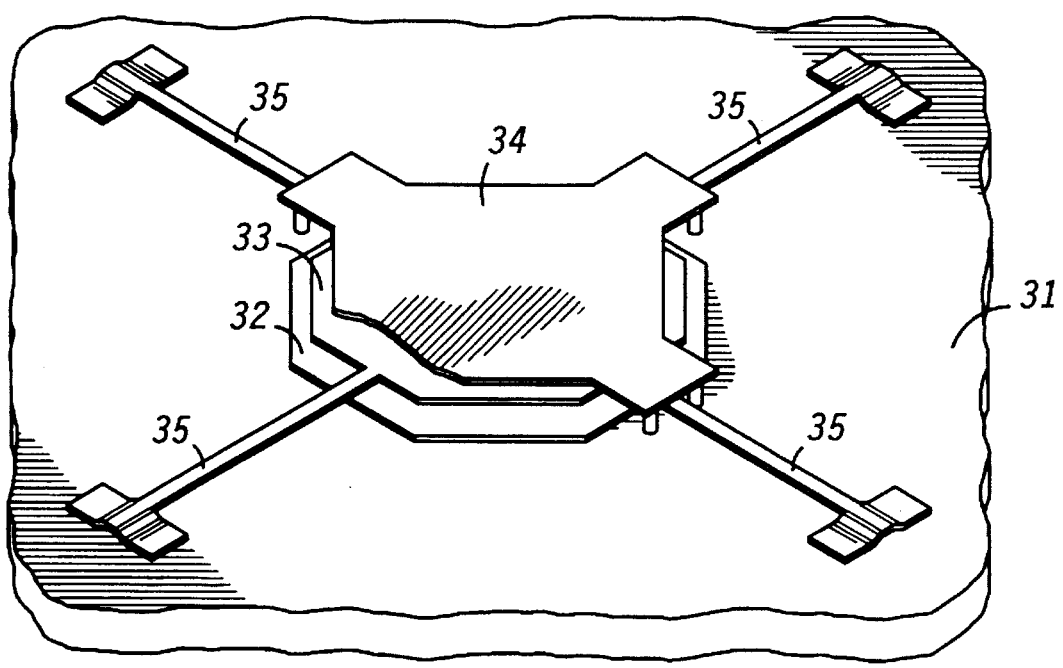
FIG. 5 is a view in perspective of a micromachined sensor in accordance with the present invention.

Turning now to the drawings in which like reference characters indicate corresponding elements throughout the several views. Attention is first directed to FIG. 1 which illustrates a prior art micromechanical sensor 10 formed on a supporting substrate 11. Sensor 10 includes a first layer 12 positioned on the surface of substrate 11, a second, floating layer 13 spaced from and in overlying relationship to first layer 12, and a third layer 14 spaced from and in overlying relationship to floating layer 13. Third layer 14 is fixedly mounted on substrate 11 so that floating layer 13 is free to move vertically between first layer 12 and third layer 14. The shapes used for these layers are arbitrary with respect to this invention.

As is understood in the art, layers 12, 13 and 14 are sufficiently conductive (doped semiconductor material or metallic coatings) to form the plates of a pair of capacitors, defined by layers 12 and 13 and by layers 13 and 14, respectively. Since floating layer 13 is free to move, outside influences or forces, such as acceleration, tend to move floating layer 13 relative to layers 12 and 14, which changes the capacitance and provides a characteristic which can be relatively easily sensed.

To provide the floating feature of layer 13, a plurality of tethers 15 are attached to edges of layer 13 in opposed relationship. In the present example, four tethers 15 are spaced 90° apart and extend outward in opposite directions. Generally, layer 13 and tethers 15 are integrally formed and incorporate a common layer of material with tethers 15 being positioned in spaced relation above substrate 11. The outer end of each tether 15 is affixed to substrate 11 by means of an anchor 16, one of which is illustrated in detail in FIGS. 2–4.

Referring specifically to FIGS. 2 and 3, one anchor 16 is illustrated in an enlarged top plan view and a side elevational view, respectively. Anchor 16 includes a foot 17, formed on the surface of substrate 11, and a riser 18, both formed integrally with tether 15. As can be seen most clearly in FIG. 3, riser 18 is a portion of material that extends upwardly from the supporting edge of foot 17 so as to connect foot 17 to tether 15. As is understood in the art, after forming first layer 12, a sacrificial layer (not shown) is deposited on the substrate and patterned. A layer of material is then formed on the sacrificial layer and layer 13 of sensor 10, and tethers 15 are formed on the sacrificial layer. A second sacrificial layer is deposited over layer 13 and another layer of material is deposited over the second sacrificial layer and formed into layer 14 of sensor 10. The sacrificial layers are then etched away to leave sensor 10, generally as illustrated in FIG. 1.

As can best be seen in FIG. 4, tether 15 may be formed with an inner, tensile material 19 (such as LPCVD $Si_3N_4$) surrounded by an outer, compressive material (generally polysilicon). Inner material 19 extends the length of tether 15 and, with the surrounding outer material, provides tether 15 with overall tensile stress. Tether 15 may also be formed using a tensile conductive material, such as amorphous (as deposited) doped silicon. At least one anchor 16 is provided with a contact on foot 17 and provides an electrical connection to floating layer 13, which serves as one terminal for each of the capacitors defined by layers 12–13 and 13–14 of sensor 10.

The major problem that arises in this structure is that various material used have different thermal coefficients of expansion. This can be the inner and outer materials of tether 15, the substrate 11 material 10 and sensor 12, 13, 14, 15 material, and the insulating material used to electrically isolate these from one another. As the ambient temperature increases, for example, tension in composite tethers 15 may increase. This increase in tension is taken up by risers 18, which would tend to flatten or flex inwardly toward floating layer 13. This flattening or flexing inwardly of risers 18 moves floating layer 13 downwardly toward first layer 12, which increases the capacitance between layers 12 and 13, and reduces the capacitance between layer 13 and 14. This change in capacitance has exactly the same effect on sensor 10 as an acceleration or other force along the Z axis (perpendicular to the surface of substrate 11). This problem arises whenever the floating layer has a thermal coefficient of expansion which differs from the substrate.

Referring now to FIG. 5, a micromachined structure, which in this specific example is a sensor 30, constructed in accordance with the present invention, is illustrated. Sensor 30, in this specific embodiment, includes a first layer 32 positioned on the surface of substrate 31, a second, floating layer 33 spaced from and in overlying relationship to first layer 32, and a third layer 34 spaced from and in overlying relationship to floating layer 33. Third layer 34 is fixedly mounted on substrate 31 so that floating layer 33 is free to move vertically between first layer 32 and third layer 34. It will of course be understood that many other types and configurations of micromachined structures could incorporate the present invention and sensor 30 is only used herein for purposes of explanation.

As is understood in the art, layers 32, 33 and 34 are sufficiently conductive (doped semiconductor material or conducting material coatings) to form the plates of a pair of capacitors, defined by layers 32 and 33 and by layers 33 and 34, respectively. Since floating layer 33 is free to move vertically, outside influences or forces, such as acceleration, tend to move floating layer 33 relative to layers 32 and 34, which changes the capacitance and provides a characteristic which can be relatively easily sensed.

To provide the floating feature of layer 33, a plurality of tethers 35 are shown attached to edges of layer 33 in opposed relationship. In the present example, four tethers 35 are spaced 90° apart and extend outwardly in opposite directions. It will of course be understood that more or less tethers 35 could be utilized and the spacing therebetween can be changed accordingly. Generally, layer 33 and tethers 35 are integrally formed and incorporate the same layer of material with tethers 35 being positioned in spaced relation above substrate 31. The outer end of each tether 35 is affixed to substrate 31 by means of an anchor 36, one of which is illustrated in detail in FIGS. 6 and 7.

Figure 6:
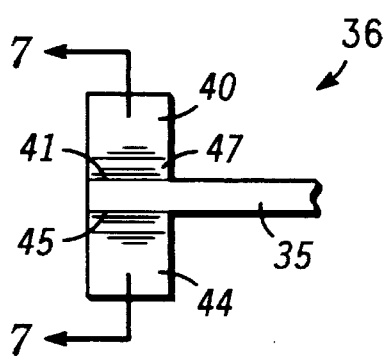
FIG. 6 is an enlarged view in top plan of a portion of the micromechanical sensor illustrated in FIG. 5.
Figure 7:
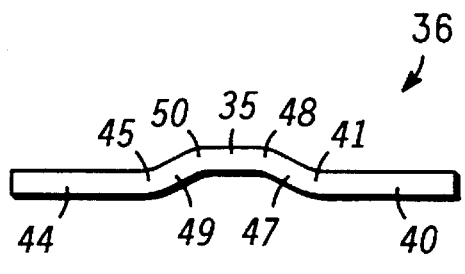
FIG. 7 is a sectional view as seen from the line 7—7 in FIG. 6.

Referring specifically to FIGS. 6 and 7, one anchor 36 is illustrated in an enlarged top plan view and a side elevational view, respectively, with a portion of an associated tether 35. Anchor 36 includes a first foot 40, formed on the surface of substrate 31, having an extended edge 41 and a second foot 44 having an extended edge 45. First foot 40 and second foot 44 are positioned so that supporting edges 41 and 45 are parallel and spaced apart. Also, supporting edges 41 and 45 extend parallel to the longitudinal axis of associated tether 35 and are positioned generally therebelow. A first riser 47 is affixed between supporting edge 41 of foot 40 and a first edge 48 of tether 35. A second riser 49 is affixed between supporting edge 45 of foot 44 and a second edge 50 of tether 35. As can be seen most clearly in FIG. 7, risers 47 and 49 are portions of material that extend upwardly so as to fixedly connect foot 40 and foot 44, respectively, to tether 35. Consequently, portions of tether 35 are integrally formed with foot 40, foot 44, and risers 47 and 49.

As can best be seen in FIG. 8, tether, 35 may be formed with an inner tensile material 52, which may be, for example, $Si_3N_4$, or any other convenient material. Inner material 52 is surrounded by an outer, possibly compressive material 53, which may be, for example, polysilicon, or the like. Inner material 52 extends the length of tether 35 and, with the surrounding outer material, provides tether 35 with overall tensile stress. At least one anchor 36 is provided with a contact on foot 40 and/or foot 44 and provides an electrical connection to floating layer 33, which serves as one terminal for each of the capacitors defined by layers 32–33 and 33–34 of sensor 30.

It should be noted that risers 47 and 49 of each anchor 36 are oriented so that the direction of rise is perpendicular to the longitudinal axis of associated tether 35. Thus, anchors 36 are stiff in the tensile direction of tethers 35. Even if, as in sensor 10 described in conjunction with FIG. 1, inner material 52 has a different thermal coefficient of expansion than surrounding outer material 53, any increases in tension in tethers 35 pulls on risers 47 and 49 perpendicular to the direction of rise and no significant flattening or flexing occurs. However, by spacing edges 41 and 45 apart and directing risers 47 and 49 toward each other, anchors 36 are compliant in the compressive direction. Thus, the tension and compression forces in tethers 35 and anchors 36 are generally isolated in orthogonal directions, which results in more consistent operation of sensor 30 over varying temperatures.

While riser 47 and 49 are shown in the embodiment of FIG. 6 as separate from foot 40 and foot 44, respectively, it should be understood that a riser might be incorporated directly into each foot, as illustrated, for example, in FIG. 9. In this slightly modified embodiment of an anchor 60 includes a foot 61 and a foot 62 each having an elongated edge 63 and 64, respectively, extending parallel to the longitudinal axis of a tether 65. As described above, edges 63 and 64 are spaced apart to provide a space therebetween.

Tether 65 is positioned as in the prior embodiment but each tether 65 includes a first portion 66 which is positioned in overlying engagement with the upper surface of foot 61 and a second portion 67 which is positioned in overlying engagement with the upper surface of foot 62. While the embodiment illustrated in FIG. 9 does not provide as good compliance in the compressive direction, it does substantially eliminate compliance in the tensile direction. It will of course be understood that many other modifications may be devised.

Turning now to FIG. 10 an additional embodiment of an anchor 70 is illustrated in top plan. Anchor 70 is a modification of anchor 36 of FIG. 6 including stress relieving features. For example, anchor 70 maybe composed of a compressive material which would tend to deform and buckle it in various directions. To compensate for these changes in stress, a slot 72 is provided in anchor 70 adjacent the feet of anchor 70, to allow inward deformation without buckling and affecting tether 75 attached thereto. In a preferred embodiment, slot 72 is configured to have a length and a width, wherein the length is greater than the width and the length runs parallel to the longitudinal axis of tether 75. Also in this preferred embodiment, slot 72 is formed in the portion of anchor 70 that represents the portion of tether 75 that is integrally formed into anchor 70, as indicated hereinbefore in the discussion of FIGS. 6 and 7. Consequently, in this preferred embodiment slot 72 may be formed in any or all of the plurality of elongated tethers, such as tethers 35 shown in FIG. 5. The asymmetric nature of slot 72 provides substantial compliance in the direction transverse to tether 75 while minimally affecting compliance in the longitudinal (tensile stress) direction. Additional or other features may be added as needed such as various holes and notches, and the term slot is intended to cover such features.

Accordingly, an improved structure for tethering floating layers in a micromachined device has been disclosed. The improved structure substantially reduces temperature sensitivity of surface micromachined sensors and the like. Specifically, the new and novel structure includes improved step-up supports for surface micromachined sensor devices which effectively isolates the tension and compression forces in tethers and anchors in generally orthogonal directions, which results in more consistent operation of micromachined sensors over varying temperatures.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A micromachined structure including at least one anchor comprising:

a supporting substrate having a major surface;

a first foot fixedly positioned on the surface of the substrate and having a supporting edge;

a tether having a longitudinal axis and positioned in spaced relation from the surface of the substrate and extending from the micromachined structure parallel to the supporting edge of the first foot; and a first riser extending along the supporting edge of the first foot and rising from the supporting edge of the first foot upwardly to the tether, the first riser being fixedly attached to the supporting edge of the first foot and the tether.

2. The micromachined structure as claimed in claim 1 wherein the first foot, the first riser and the tether are integrally formed.

3. The micromachined structure as claimed in claim 1 wherein the first riser is perpendicular to the longitudinal axis of the tether.

4. The micromachined structure as claimed in claim 1 including in addition a second foot fixedly positioned on the surface of the substrate and having a supporting edge positioned parallel with and in spaced relation from the supporting edge of the first foot, and a second riser extending along the supporting edge of the second foot and rising from the edge of the second foot upwardly to the tether, the second riser being fixedly attached to the supporting edge of the second foot and the tether.

5. The micromachined structure as claimed in claim 4 wherein the tether has first and second parallel spaced apart edges and the first riser is fixedly attached to the first edge of the tether and the second riser is fixedly attached to the second edge of the tether.

6. The micromachined structure as claimed in claim 4 wherein the first foot, the first riser, the second foot, the second riser and the tether are integrally formed.

7. The micromachined structure as claimed in claim 4 further including a stress relieving feature formed in the tether.

8. The micromachined structure as claimed in claim 4 further comprising a slot formed in the tether adjacent the first foot and the second foot.

9. The micromachined structure as claimed in claim 8 wherein the slot is comprised of a length and a width, the length being parallel to the longitudinal axis of the tether.

10. A micromachined structure comprising:

a supporting substrate having a major surface;

a floating layer of material parallel with the major surface of the substrate and spaced therefrom;

a plurality of elongated tethers each having a longitudinal axis and having one end affixed to the floating layer and a second end extending outwardly from the floating layer, the elongated tethers being positioned at spaced apart intervals about the micromachined structure; and a plurality of anchors one each positioned adjacent the second end of each of the plurality of tethers to form a plurality of anchors each with an associated elongated tether, each anchor including, a first foot fixedly positioned on the surface of the substrate and having a supporting edge extending parallel with the associated elongated tether, and a first riser extending along the supporting edge of the first foot and rising from the supporting edge of the first foot upwardly to the associated elongated tether, the first riser being fixedly attached to the supporting edge of the first foot and the associated elongated tether.

11. A micromachined structure as claimed in claim 10 wherein the first foot, the first riser and the associated elongated tether are integrally formed.

12. The micromachined structure as claimed in claim 10 wherein the first riser is perpendicular to the longitudinal axis of the elongated tether.

13. A micromachined structure as claimed in claim 10 wherein each anchor includes in addition a second foot fixedly positioned on the surface of the substrate and having a supporting edge positioned parallel with and in spaced relation from the supporting edge of the first foot, and a second riser extending along the supporting edge of the second foot and rising from the supporting edge of the second foot upwardly to the associated elongated tether, the second riser being fixedly attached to the supporting edge of the second foot and the associated elongated tether.

14. A micromachined structure as claimed in claim 13 wherein each of the plurality of the associated elongated tethers has first and second parallel spaced apart edges and with each anchor the first riser is fixedly attached to the first edge of the associated elongated tether and the second riser is fixedly attached to the second edge of the associated elongated tether.

15. A micromachined structure as claimed in claim 13 wherein the first foot, the first riser, the second foot, and the second riser of each anchor and the associated elongated tether are integrally formed.

16. The micromachined structure as claimed in claim 10 further including a stress relieving feature formed in the plurality of elongated tethers.

17. A micromachined structure comprising:

a supporting substrate having a major surface;

a floating layer of material parallel with the major surface of the substrate and spaced therefrom;

a plurality of elongated tethers each having one end affixed to the floating layer and a second end extending outwardly from the floating layer, each of the plurality of tethers having first and second parallel spaced apart edges parallel with an elongated axis of the tether, and the elongated tethers being positioned at spaced apart intervals about the micromachined structure; and a plurality of anchors one each positioned adjacent the second end of each of the plurality of tethers to form a plurality of anchors each with an associated tether, each anchor including, a first foot fixedly positioned on the surface of the substrate, a first riser coupled to the first foot and the associated tether and extending from the associated elongated tether substantially perpendicular to its elongated axis, and a second foot fixedly positioned on the surface of the substrate, a second riser coupled to the second foot and the associated tether and extending from the associated elongated tether substantially perpendicular to its elongated axis.

18. A micromachined structure as claimed in claim 17 wherein the first foot, the first riser, the second foot, and the second riser of each anchor and the associated elongated tether are integrally formed.

19. The micromachined structure as claimed in claim 17 further including a stress relieving feature formed in the plurality of elongated tethers.

* * * * *